(12) United States Patent
Chiarizio et al.

(10) Patent No.: US 10,764,810 B1
(45) Date of Patent: Sep. 1, 2020

(54) SYSTEMS AND METHODS FOR ADAPTIVELY JOINING A WIRELESS COMMUNICATION NETWORK

(71) Applicant: JOHNSON CONTROLS FIRE PROTECTION LP, Boca Raton, FL (US)

(72) Inventors: Martin A. Chiarizio, Coral Springs, FL (US); Robert Reginald Albert Feltham, Fort Lauderdale, FL (US); Howard Sevrinsky, Coconut Creek, FL (US)

(73) Assignee: JOHNSON CONTROLS FIRE PROTECTION LP, Boca Raton, FL (US)

( * ) Notice: Subject to any disclaimer, the term of this patent is extended or adjusted under 35 U.S.C. 154(b) by 0 days.

(21) Appl. No.: 16/363,666

(22) Filed: Mar. 25, 2019

(51) Int. Cl.
| | |
|---|---|
| *H04W 4/00* | (2018.01) |
| *H04W 40/16* | (2009.01) |
| *H04W 24/10* | (2009.01) |
| *H04B 17/318* | (2015.01) |
| *H04B 17/345* | (2015.01) |

(52) U.S. Cl.
CPC .......... *H04W 40/16* (2013.01); *H04W 24/10* (2013.01); *H04B 17/318* (2015.01); *H04B 17/345* (2015.01)

(58) Field of Classification Search
None
See application file for complete search history.

(56) References Cited

U.S. PATENT DOCUMENTS

| | | |
|---|---|---|
| 2006/0126514 A1 | 6/2006 | Lee et al. |
| 2011/0287795 A1 | 11/2011 | Cahill |
| 2013/0094422 A1 | 4/2013 | Thanikachalam |
| 2016/0278072 A1 | 9/2016 | Palle |
| 2017/0251507 A1 | 8/2017 | Fodor et al. |

FOREIGN PATENT DOCUMENTS

| | | |
|---|---|---|
| WO | 2007082254 A1 | 7/2007 |

OTHER PUBLICATIONS

C. Abou-Rjeily et al; "Inter-Relay Cooperation: A New Paradigm for Enhanced Relay-Assisted FSO Communications," in IEEE Transactions on Communications, vol. 62, No. 6, pp. 1970-1982, Jun. 2014, doi: 10.1109/TCOMM.2014.2316262.
International Search Report and Written Opinion issued for PCT/US2020/016973 dated Apr. 17, 2020.

*Primary Examiner* — Phuongchau Ba Nguyen
(74) *Attorney, Agent, or Firm* — Arent Fox LLP (57) ABSTRACT

A system includes a wireless communication device that joins a wireless communication network. Specifically, the wireless communication device measures a quality metric of the wireless communication network in response to a trigger to join the wireless communication network. The wireless communication device determines whether the quality metric indicates a high quality environment or a low quality environment for communicating signals. In response to the quality metric indicating the high quality environment, the wireless communication device selects a first pathway with an optimum transmission time between the wireless communication device and a central controller of the wireless communication network. In response to the quality metric indicating a low quality environment, the wireless communication device selects a second pathway comprising an optimum quality link between the wireless communication device and another wireless communication device in the wireless communication network.

20 Claims, 5 Drawing Sheets

SYSTEMS AND METHODS FOR ADAPTIVELY JOINING A WIRELESS COMMUNICATION NETWORK

BACKGROUND

The present disclosure relates generally to wireless communication, and more particularly, to systems and methods for joining a wireless communication network.

In a network of wirelessly connected devices, a radio-frequency (RF) data pathway may be established between each device and a central controller. However, due to changing environmental conditions such as increased RF background noise, the quality and/or strength of the RF signals communicated between a device and the central controller may deteriorate over time. For example, the Signal to Noise Ratio (SNR) of the RF signals received by a device may drop below an acceptable level. Thus, improvements are desired in wireless communication systems.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure provides systems, apparatuses, and methods that allow for a wireless communication device to adaptively join or rejoin a wireless communication network based on a quality metric of the wireless communication network.

In an aspect, a method of joining a wireless communication network by a first wireless communication device is provided. The method may include measuring a quality metric of the wireless communication network by the first wireless communication device in response to a trigger to join the wireless communication network. The method may further include determining whether the quality metric indicates a high quality environment or a low quality environment for communicating signals. The method may further include selecting, in response to the quality metric indicating the high quality environment, a first pathway with an optimum transmission time between the first wireless communication device and a central controller of the wireless communication network. The method may further include selecting, in response to the quality metric indicating a low quality environment, a second pathway comprising an optimum quality link between the first wireless communication device and a second wireless communication device in the wireless communication network.

In a further aspect, a first wireless communication device is provided that includes a processor and a memory coupled to the processor and storing instructions. The instructions, when executed by the processor, may cause the processor to measure a quality metric of a wireless communication network in response to a trigger to join the wireless communication network. The instructions, when executed by the processor, may further cause the processor to determine whether the quality metric indicates a high quality environment or a low quality environment for communicating signals. The instructions, when executed by the processor, may further cause the processor to select, in response to the quality metric indicating the high quality environment, a first pathway with an optimum transmission time between the first wireless communication device and a central controller of the wireless communication network. The instructions, when executed by the processor, may further cause the processor to select, in response to the quality metric indicating a low quality environment, a second pathway comprising an optimum quality link between the first wireless communication device and a second wireless communication device in the wireless communication network.

In another aspect, a non-transitory computer-readable medium storing instructions is provided. The instructions, when executed by a processor of a first wireless communication device, may cause the first wireless communication device to join a wireless communication network. Specifically, the processor may be configured to measure a quality metric of the wireless communication network by the first wireless communication device in response to a trigger to join the wireless communication network. The processor may be further configured to determine whether the quality metric indicates a high quality environment or a low quality environment for communicating signals. The processor may be further configured to select, in response to the quality metric indicating the high quality environment, a first pathway with an optimum transmission time between the first wireless communication device and a central controller of the wireless communication network. The processor may be further configured to select, in response to the quality metric indicating a low quality environment, a second pathway comprising an optimum quality link between the first wireless communication device and a second wireless communication device in the wireless communication network.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components may be shown in block diagram form in order to avoid obscuring such concepts.

Aspects of the present disclosure provide methods and systems that allow for a wireless communication device to measure a quality metric of a wireless communication network and then use the quality metric to adaptively join or rejoin the wireless communication network by establishing an optimal pathway to communicate data with a central controller, either directly or through one or more other devices connected to the central controller. The quality metric may be or may include, for example, network connectivity, traffic, throughout, noise level, interference level, bandwidth usage, or any other metric that may affect or indicate the quality of communicating signals in the operational radio-frequency (RF) bandwidth over the wireless communication network.

In an aspect, for example, the wireless communication device may scan the wireless communication network, determine an RF background noise level in the wireless communication network, compare the RF background noise level with a threshold noise level, and depending on whether or not the RF background noise level is smaller than the threshold noise level, adaptively select and implement at least two different algorithms to establish an optimal pathway between the wireless communication device and a central controller in the wireless communication network.

More specifically, for example, in an aspect, the wireless communication device may scan the entire operational spectrum or analyze the RF background noise level of each channel to determine if the wireless communication device is operating in a low level of RF background noise or in a high level of RF background noise. In an aspect, a low level of RF background noise may indicate a "quiet" network with a bigger fade margin, i.e., a bigger margin to tolerate fade due to transitory changes in the RF environment, for example, a large metal truck passing and obscuring an RF pathway. In this case, the wireless communication device may attempt to reach other devices that are closer to the central controller so that the number of RF connection points or "links" between the wireless communication device and the central controller is lower. In contrast, a high level of RF background noise may indicate a "noisy" network with smaller fade margins leading to a higher possibility of the messages getting corrupted due to transitory deteriorations in the RF environment. In this case, the wireless communication device may attempt to connect to the strongest candidate device to create the strongest possible RF link. As a result, as compared to a "quiet" network, in a "noisy" network the number of RF links between the wireless communication device and the central controller may be higher, but each link may be shorter and stronger. Although a higher link count may increase the time the messages take to transit between the wireless communication device and the central controller, due to each link being short and strong, more reliable message handling may be provided in the "noisy" network.

Turning now to the figures, example aspects are depicted with reference to one or more components described herein, where components in dashed lines may be optional.

Figure 1:
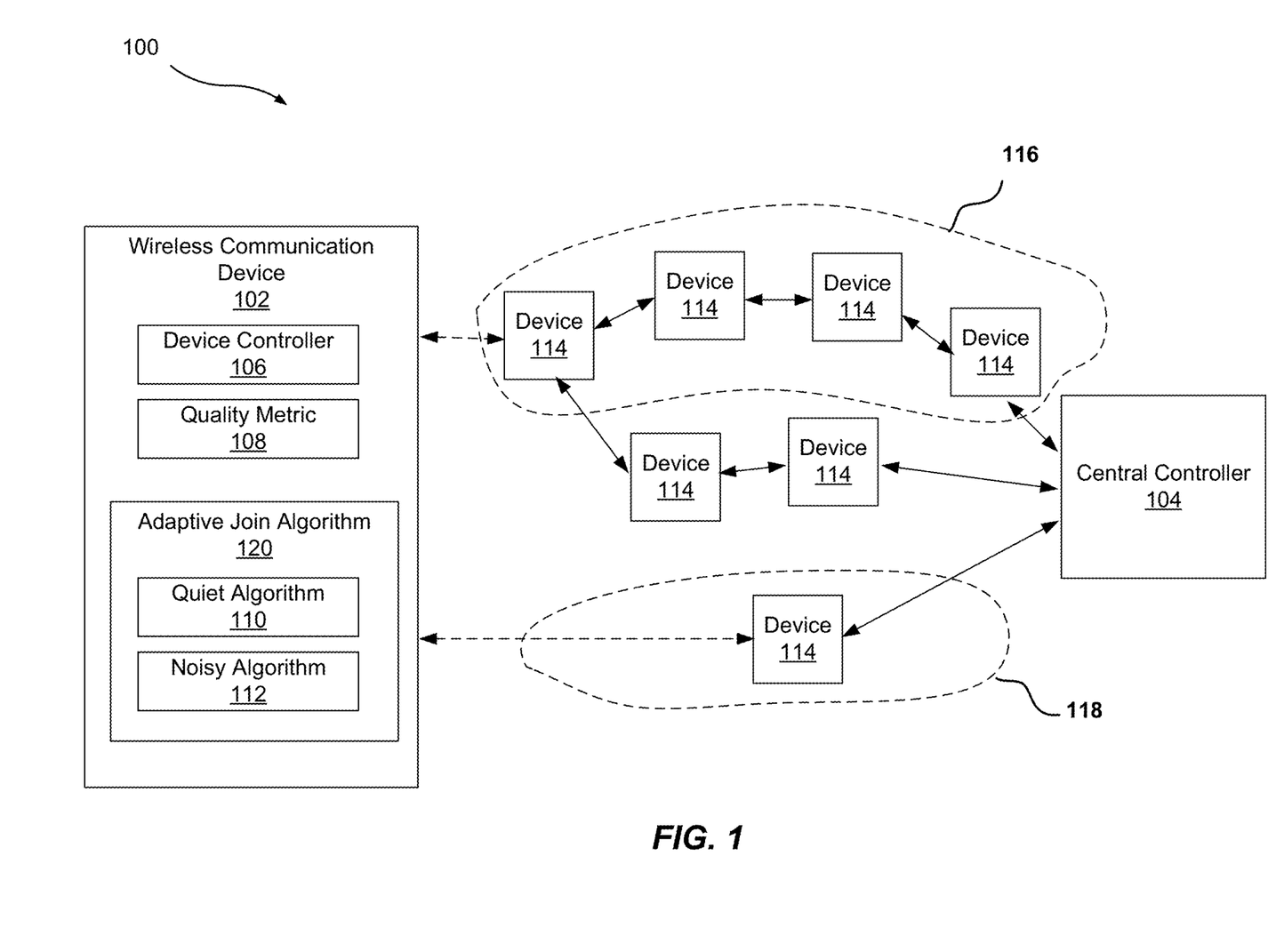
FIG. 1 is a schematic diagram of an example wireless communication network including a wireless communication device configured to adaptively join or rejoin a wireless communication network.

Referring to FIG. 1, in one non-limiting aspect, a device controller 106 of a wireless communication device 102 may determine a quality metric 108 associated with a wireless communication network 100, and may execute an adaptive join algorithm 120 that uses the quality metric 108 to adaptively select an appropriate one of multiple possible algorithms for joining the wireless communication network 100. In some aspects, the aforementioned joining further encompasses devices that are rejoining the wireless communication network 100. For example, in an aspect, based on the quality metric 108, the adaptive join algorithm 120 may select either a "quiet" algorithm 110 or a "noisy" algorithm 112 to establish an optimal pathway for communicating data with a central controller 104 in the wireless communication network 100.

For example, in an aspect, the quality metric 108 may include or may be indicative of an RF background noise level observed by the wireless communication device 102 in the wireless communication network 100. In some aspects, for example, the RF background noise level may indicate noise levels present and observable at the location of the wireless communication device 102 in the wireless communication network 100. In this case, the device controller 106 may compare the quality metric 108 with an RF background noise threshold as further described in detail below. In response to the quality metric 108 being less than the RF background noise threshold, the device controller 106 may determine that the wireless communication network 100 is "quiet," and may thus select and execute the "quiet" algorithm 110 to establish a first pathway 118 for communicating data with the central controller 104. Also, in response to the quality metric 108 not being less than the RF background noise threshold, the device controller 106 may determine that the wireless communication network 100 is "noisy," and may thus select and execute the "noisy" algorithm 112 to establish a second pathway 116 for communicating data with the central controller 104.

In an aspect, for example, the "quiet" algorithm 110 may qualify possible devices 114 to connect to by listening for devices 114 that have the fewest number of RF links to the central controller 104. In an aspect, for example, the "quiet" algorithm 110 may look for devices 114 that are physically closest to the central controller 104 since such devices 114 may have the fewest number of hops/links to the central controller 104. In an aspect, if there are multiple candidates with the same minimum number of RF links to the central controller 104, the "quiet" algorithm 110 may choose the device 114 which has the strongest signal and may thus provide the strongest link with the wireless communication device 102.

Optionally, the "quiet" algorithm 110 may limit the search to those devices 114 that have a minimum received signal strength indicator (RSSI) that allows for a minimum safe connection strength level to guarantee a required fade margin in case of random/intermittent RF noise. Using such minimum RSSI level to qualify possible candidates may reduce the candidates/devices 114 to those that have a safe connection signal strength versus all the candidates that may otherwise provide lower quality links with the wireless communication device 102.

In an aspect, for example, for each new candidate, the "quiet" algorithm 110 may determine how many RF links are between that candidate and the central controller 104, and may then listen for more possible candidates. The "quiet" algorithm 110 may compare the number of RF links between each new candidate and the central controller 104 to the number of RF links between a previously qualified candidate and the central controller 104. If a new candidate provides a lower RF link count, the "quiet" algorithm 110 may select the new candidate as the preferred candidate for connecting to. Optionally, the "quiet" algorithm 110 may perform the above only for candidates that meet the required minimum RSSI level that provides a required fade margin.

In an aspect, the "quiet" algorithm 110 may repeat the aforementioned "listen/scan" process to scan all possible candidates and or channels to qualify the best candidate that is closest to the central controller 104 while meeting the minimum RSSI threshold. As a result, the "quiet" algorithm 110 may establish the first pathway 118 that is short in terms of the number of hops/links but includes RF links that are physically long since the RF signals get to the central controller 104 in a lower number of RF links.

Alternatively, in a "noisy" environment where physically long-distance links are more susceptible to RF noise and may thus make data reception more difficult, the device controller 106 may select and execute the "noisy" algorithm 112 to establish the second pathway 116 that includes physically shorter and stronger links. Specifically, in this case, the "noisy" algorithm 112 looks for candidates that have a required minimum RSSI that provides a safe connection strength to meet a required fade margin in the noisy environment. In an aspect, the minimum RSSI requirement used in the "noisy" algorithm 112 may be higher than the minimum RSSI requirement optionally used in the "quiet" algorithm 110 to qualify safe candidates for the first pathway 118.

In an aspect, when joining the wireless communication network 100 for the first time, the "noisy" algorithm 112 looks for a device 114 with the strongest signal. If there is more than one device 114 with the strongest signal, the "noisy" algorithm 112 may select the candidate with the shortest time to the central controller 104, i.e., the candidate that provides the fewest number of RF links/hops to the central controller 104.

Subsequently, at a later time, the wireless communication device 102 may rejoin the wireless communication network 100, for example, if the wireless communication device 102 falls off the wireless communication network 100 or if the wireless communication device 102 is scanning the status of the wireless communication network 100 and monitoring the RSSI level and the RF background noise. For example, after joining the wireless communication network 100 for the first time, the wireless communication device 102 may periodically or continuously run an RF background noise scan to determine the best adaptive join algorithm 120 to use in case the RF environment changes or in case the wireless communication device 102 needs to rejoin the wireless communication network 100 for any reason.

In this case, the "noisy" algorithm 112 again looks for the strongest signal but now knows the relative position/distance of the wireless communication device 102 with respect to the central controller 104. Accordingly, for each candidate, the "noisy" algorithm 112 determines if the number of links between the candidate and the central controller 104 is at least one link/hop less than the number of links/hops in an existing or currently implemented pathway between the wireless communication device 102 and the central controller 104. Optionally, the "noisy" algorithm 112 may only consider candidates that meet a minimum RSSI level of the noisy environment, and may attempt to find a device 114 that is closer to the central controller 104 and also has the strongest signal over the optional "noisy" minimum RSSI level. However, the "noisy" algorithm 112 may not always be able to find a device 114 that satisfies both of the aforementioned criteria in a "noisy" environment, and may thus only enforce the distance criteria.

In an aspect, instead of selecting a candidate that is closest to the central controller 104, the "noisy" algorithm 112 optimally attempts to select the candidate that provides the strongest RF signal to the wireless communication device 102 and is also at least one RF link closer to the central controller 104 as compared to an existing or currently implemented pathway of the wireless communication device 102 to the central controller 104. By doing so, the "noisy" algorithm 112 creates the second pathway 116 that includes RF links that are stronger and shorter in physical distance, as compared to the first pathway 118. In an aspect, for example, the "noisy" algorithm 112 may complete several "listen" cycles to listen for and qualify the best candidate and thereby stablish the optimal second pathway 116.

Accordingly, by implementing the adaptive join algorithm 120 based on measuring a quality metric 108 such as the RF background noise in the wireless communication network 100, the wireless communication device 102 may adapt to any changes that affect the RF environment as locally perceived by the wireless communication device 102, and may optimize the RF links to compensate for such changes. In an aspect, each device 114 in the wireless communication network 100 may choose the join algorithm that is best for the local environment of that device 114, thus providing a hybrid network where some devices 114 may have a "quiet" environment and may thus implement the shortest pathway to the central controller 104, while other devices 114 may be in a "noisy" environment and may thus select the shortest and strongest link to another device that is closer to the central controller 104.

In some alternative aspects, the wireless communication device 102 may be configured to always execute the "noisy" algorithm 112 to establish the second pathway 116 with short and strong links. However, as compared to the adaptive join algorithm 120 that adaptively selects either the first pathway 118 which is the fastest pathway or the second pathway 116 which is the most reliable pathway, always selecting the second pathway 116 may not be desirable, for example, in systems where response time is critical and restricted to a defined time limit. In such systems, having a lower number of RF links in a "quiet" environment is more desirable since using a pathway with many short and strong links may result in longer communication channels which may not accommodate an enforced response time. By using the adaptive join algorithm 120, the present aspects establish the fastest and most reliable pathway that is possible under each RF environment.

In an aspect, optionally, a maximum number of pathway links may be defined/imposed by a required network response time. For example, in an aspect, in the fire alarm industry, there may be a requirement for a 10 second response time from the time of local detection and notification of an alarm to the time the alarm gets transmitted to an alarm panel and is broadcast to the farthest notification point in the alarm panel. Accordingly, the maximum allowable number of pathway links may depend on how long one device takes to transfer the alarm to the next device until the alarm is repeated up to the alarm panel. For example, an alarm system may allow for a maximum of 25 hops or links inbound and outbound.

Optionally, in an aspect, when the measured RF background noise level crosses the RF noise threshold or is in a neighborhood of the RF noise threshold, the device controller 106 of the wireless communication device 102 may implement a tolerance RF noise level in selecting the appropriate algorithm. For example, if the first pathway 118 is currently selected for the wireless communication device 102 by the "quiet" algorithm 110, and then the device controller 106 determines that the RF background noise level has increased to slightly above the RF noise threshold, the device controller 106 may not immediately implement/execute the "noisy" algorithm 112 to switch from using the first pathway 118 to using the second pathway 116. Instead, the device controller 106 may allow for the RF background noise level to increase beyond the RF noise threshold plus the tolerance noise level, before deciding to activate the "noisy" algorithm 112 and switching to the second pathway 116.

In an aspect, each device 114 in the wireless communication network 100 broadcasts a beacon, for example, every 400 milliseconds, over one of a number of channels, for example, one of 36 different channels. Accordingly, the wireless communication device 102 may listen to devices 114 that are broadcasting their beacons, and measure the received absolute signal strength of the beacons. The wireless communication device 102 may compare the received absolute signal strength with the noise level in the background dead zone, i.e., in the time between signals, and thus obtain the RSSI of the beacon. Further, each beacon may include information indicative of the number of links/hops in a pathway between the transmitting device 114 and the central controller 104. Optionally, in an aspect, the beacon transmitted by each device 114 may also include information indicative of the modality that the corresponding device 114 is operating at to establish the pathway to the central controller 104, i.e., whether the corresponding device 114 itself is currently using a pathway that is implemented by the "quiet" algorithm 110 or by the "noisy" algorithm 112.

In some aspects, at least some of the devices 114 may be intelligent devices 114 capable of parsing the messages communicated through them between the wireless communication device 102 and the central controller 104. Such intelligent device 114 may thus react to the messages accordingly or as configured. For example, such intelligent devices 114 may perform at least part of the functionality of the central controller 104, for example, on behalf of the central controller 104.

In some aspects, an RF pathway such as the first pathway 118 or the second pathway 116 may correspond to a geographical pathway defined by the geographical location of the constituent links/hops of the RF pathway, e.g., the geographical location of devices 114 that form the RF pathway.

In some aspects, the status of devices 114 in the wireless communication network 100 may be supervised and monitored periodically, for example, every 90 seconds, by the central controller 104. For example, in an aspect, the central controller 104 may query the devices 114 regarding their performance. If a device 114 does not respond to a query or a supervision poll, the central controller 104 may also perform a number of retries, e.g., 10 retries, to obtain the status of that device 114.

In some aspects, the wireless communication device 102 may go to sleep, for example, to save battery power, and may then attempt to rejoin the wireless communication network 100 later when the wireless communication device 102 wakes up. In this case, the configuration/status of the devices 114 and their connection pathways to the central controller 104 may have changed during the time when the wireless communication device 102 was asleep. Therefore, the wireless communication device 102 may choose to "forget" any previously-obtained information about the wireless communication network 100, e.g., the last relative distance between the wireless communication device 102 and the central controller 104, and may establish a pathway as if the wireless communication device 102 is joining the wireless communication network 100 for the first time.

Optionally, in an aspect, the central controller 104 may be a fire alarm control panel (FACP), the devices 114 may include redundant repeaters providing multiple pathways to the FACP, and the wireless communication device 102 may be a detector or a poll station that communicates messages with the FACP through the repeaters/devices 114. In this case, if a message is not communicated between the wireless communication device 102 and the central controller 104 in a timely manner, a different pathway may be tried.

In one non-limiting aspect, for example, the signal strength of signals transmitted by the wireless communication device 102 at an operational frequency may be, for example, 10 db. The wireless communication device 102 may then detect the RF background noise level at the operational frequency to be, for example, between −120 db to −80 db depending on the sensitivity of a receiver of the wireless communication device 102. In this case, if the wireless communication device 102 requires a 10 db signal to noise ratio (SNR) to detect a signal, there is a large fade margin in the RF environment, and therefore the wireless communication device 102 may determine that the RF environment is "quiet." In an aspect, for example, any RF environment with an RF background noise level below −60 db may be determined to be a "quiet" environment. Alternatively, any RF environment with an RF background noise level above −60 db may be determined to be a "noisy" environment.

In an aspect, the wireless communication device 102 may implement frequency hopping spread spectrum (FHSS) for communicating RF signals in the wireless communication network 100, and may thus hop over multiple channels.

In an aspect, the RF noise threshold for deciding which join algorithm to use may be determined and/or adjusted based on compliance requirements imposed on the fade margin. In an aspect for example, the RF noise threshold to switch from using the "quiet" algorithm 110 to using the "noisy" algorithm 112 may be, for example, −60 db. In an aspect, the RF noise threshold used in each wireless communication device to select a pathway may depend on the RF sensitivity of that wireless communication device. For example, in an aspect, a wireless communication device that has a high RF sensitivity may be capable of improved out-of-channel rejection and may not be too sensitive to noise or interference signals that are close to the operational frequency of that wireless communication device. Accordingly, compared to wireless communication devices with lower sensitivity, a higher-sensitivity wireless communication device may implement a higher RF background noise threshold for switching from using the "quiet" algorithm 110 to using the "noisy" algorithm 112.

Optionally, in an aspect, the RF noise threshold used in the wireless communication device 102 for switching from using the "quiet" algorithm 110 to using the "noisy" algorithm 112 may be adjusted over time based on various conditions in the wireless communication network 100. For example, in an aspect, the wireless communication device 102 may continually observe very strong signals from the devices 114, and/or the wireless communication device 102 may determine that the wireless communication network 100 corresponds to a geographically tight space resulting in stronger links between various devices in the wireless communication network 100. In this case, the wireless communication device 102 may increase the RF noise threshold used for switching from using the "quiet" algorithm 110 to using the "noisy" algorithm 112. In an aspect, for example, the wireless communication device 102 may average the signal strengths observed from other devices 114 in the wireless communication network 100, and may then adjust the RF noise threshold based on such average signal strength.

Optionally, the wireless communication device 102 may be triggered to execute the adaptive join algorithm 120 based on reasons other than how the RF background noise compares to an RF noise threshold for switching between using the "quiet" algorithm 110 and using the "noisy" algorithm 112. For example, in an aspect, the wireless communication device 102 may be triggered to execute the adaptive join algorithm 120 when the wireless communication device 102 is turned on or is switched out of an "airplane" mode. As another example, the wireless communication device 102 may repeatedly fall off the wireless communication network 100, i.e., may repeatedly get disconnected from the wireless communication network 100, and may monitor the time and/or frequency of the fall offs. In response to recurrent fall offs, the wireless communication device 102 may determine that a strong intermittent RF background noise or a strong intermittent interference is present. For example, in one non-limiting aspect, the wireless communication device 102 may repeatedly fall off the wireless communication network 100 due to a periodic transmitter transmitting a signal every 5 or 10 minutes, bursting for 10-30 seconds. In this case, although the RF background noise level may be less than the RF noise threshold, the wireless communication device 102 may switch to the "noisy" algorithm 112 to use shorter/stronger links so as to be capable of tolerating the bursty interference and avoiding repeated/recurrent falling off the wireless communication network 100.

In an aspect, each one of the "quiet" algorithm 110 and the "noisy" algorithm 112 may spend a limited amount of time or a limited number of iterations over the candidate devices 114 to find a suboptimal pathway so that the wireless communication device 102 may quickly join or rejoin the wireless communication network 100 and start communicating with the central controller 104. Thereafter, while the wireless communication device 102 is communicating over the suboptimal pathway, the applicable one of the "quiet" algorithm 110 or the "noisy" algorithm 112 may continue to iterate over more candidates devices 114 and look for a better pathway, for example, a pathway with either a faster transmission time or with stronger higher quality links. If a better candidate is found, the applicable one of the "quiet" algorithm 110 or the "noisy" algorithm 112 may select the better candidate so as to replace the suboptimal pathway with a more optimal pathway that includes the better candidate. For example, while the wireless communication device 102 is communicating over the first pathway 118 in a "quiet" environment, the "quiet" algorithm 110 may continue to look for a better candidate with a higher RSSI. Similarly, while the wireless communication device 102 is communicating over the second pathway 116 in a "noisy" environment, the "noisy" algorithm 112 may continue to look for a better candidate with a higher RSSI or a shorter distance to the central controller 104 in terms of the number of hops/links.

In an aspect, even if the initially established pathway by the "quiet" algorithm 110 or the "noisy" algorithm 112 is the optimal pathway, the configuration and/or the RF conditions in the wireless communication network 100 may change over time. Accordingly, in this case as well, while the wireless communication device 102 is communicating over the previously-optimal pathway, the applicable one of the "quiet" algorithm 110 or the "noisy" algorithm 112 may continue to iterate over more candidates to determine if the previously-optimal pathway is still optimal or if there is a better pathway due to a change in the wireless communication network 100. If a better candidate is found, the applicable one of the "quiet" algorithm 110 or the "noisy" algorithm 112 may select the better candidate so as to replace the previously-optimal pathway with the newly-optimal pathway that includes the better candidate. Accordingly, the wireless communication network 100 may be strengthened continuously.

In an aspect, the execution of the adaptive join algorithm 120 to select the "quiet" algorithm 110 or the "noisy" algorithm 112 may be triggered by one or more events. For example, while the wireless communication device 102 is communicating over the wireless communication network 100, the adaptive join algorithm 120 may be executed upon an expiration of a timer. As another example, the adaptive join algorithm 120 may be executed upon detecting an increased rate of the wireless communication device 102 falling off the wireless communication network 100. For example, the device controller 106 may historically track the fall offs of the wireless communication device 102 from the wireless communication network 100, and may determine that the fall off rate has changed, for example, from a single fall off per hour to 10 fall offs per hour. Such a change in the fall off rate of the wireless communication device 102 may be associated with, for example, a structural change in a building where the wireless communication device 102 is operating or is installed. For example, the structural change may correspond to the placement of an obstacle that blocks an RF pathway in the environment of the wireless communication device 102 and/or in the environment of a device 144 that provides the pathway used by the wireless communication device 102 to communicate with the central controller 104 in the wireless communication network 100.

Alternatively and/or additionally, in an aspect, the execution of the adaptive join algorithm 120 to select the "quiet" algorithm 110 or the "noisy" algorithm 112 may be triggered by a change in the bandwidth usage or the throughput over the wireless communication network 100. For example, the wireless communication device 102 may monitor the number of signals observed in an operational frequency and/or may otherwise determine the bandwidth usage in the wireless communication network 100. In an aspect, for example, the wireless communication device 102 may initially determine that an environment is "quiet" and may thus execute the "quiet" algorithm 110 to establish the first pathway 118. Thereafter, the wireless communication device 102 may determine that the bandwidth usage in the corresponding operational frequency over the wireless communication network 100 has increased beyond a threshold, for example, from a 10% bandwidth usage to a 40% bandwidth usage. Such an increase in the bandwidth usage may result in increased message retries as the messages of the wireless communication device 102 may clash with messages of other devices that use the same operational frequency. Accordingly, in response to determining the increase in the bandwidth usage, the wireless communication device 102 may execute the "noisy" algorithm 112 to establish the second pathway 116 to communicate with the central controller 104. As such, the wireless communication device 102 may achieve improved message communication even under increased bandwidth usage.

For example, in an aspect, the adaptive join algorithm 120 may switch from the "quiet" algorithm 110 to the "noisy" algorithm 112 when a threshold of activity is reached in the operational frequency, e.g., when the activity in the operational frequency becomes greater than 30% of the available bandwidth. For example, in one non-limiting aspect, the wireless communication device 102 may monitor the operational frequency for 60 seconds and determine that 45 seconds of the 60 seconds are currently being used for communication by other devices in the wireless communication network 100. In this case, the wireless communication device 102 may implement listen-before-transmit (LBT) functionality and listen for a free time before attempting to transmit.

Alternatively, the wireless communication device 102 may implement frequency hopping and may thus have a 25% chance of successful transmission when waking up to transmit at each hop time, and after each frequency hopping transmission, the wireless communication device 102 may wait for an acknowledgement from the corresponding receiving device. For example, in an aspect, the wireless communication device 102 may transmit at the same time as another device but with a stronger transmission power than the other device. In this case, a corresponding receiving device may receive a garbled message but may still be able to discern the stronger signal of the wireless communication device 102 and send back an acknowledgement. However, in case the receiving device is unable to discern the stronger signal of the wireless communication device 102, the receiving device may send back a negative acknowledgement, and thus the wireless communication device 102 may have to retransmit the message one or more times until an acknowledgement is received from the receiving device. This repetition may be tolerable in a quiet environment where the wireless communication device 102 sends messages over longer distances, although the longer the distance the more devices may see the messages of the wireless communication device 102. In a "noisy" environment, however, the wireless communication device 102 may prefer to send the messages to a better candidate with fewer hops/links to the central controller 104, so that not many hops/repeaters have to repeat the messages multiple times in case retransmissions are needed. That is, by reducing the number of hops to the central controller 104, the wireless communication device 102 may reduce the noise produced in the wireless communication network 100 due to multiple hops performing retransmissions of the messages of the wireless communication device 102.

As such, in one aspect, the wireless communication device 102 may decide to implement the "quiet" algorithm 110 in an environment that is "noisy" due to a very limited available bandwidth. In an aspect, for example, the wireless communication device 102 may implement the "quiet" algorithm 110 in an environment that is "quiet" with abundant available bandwidth, may switch to the "noisy" algorithm 112 in an environment that is "noisy" with reduced available bandwidth, and may switch back to the "quiet" algorithm 110 in an environment that is very "noisy" with substantially diminished available bandwidth that may necessitate multiple message retransmissions. In an aspect, the thresholds for the aforementioned back and forth switching between the "quiet" algorithm 110 and the "noisy" algorithm 112 may be determined by experimentation, for example.

In an aspect, the bandwidth usage over the wireless communication network 100 may be measured by the wireless communication device 102. Alternatively, the bandwidth usage over the wireless communication network 100 may be measured and broadcast by another device in the wireless communication network 100.

Figure 2:
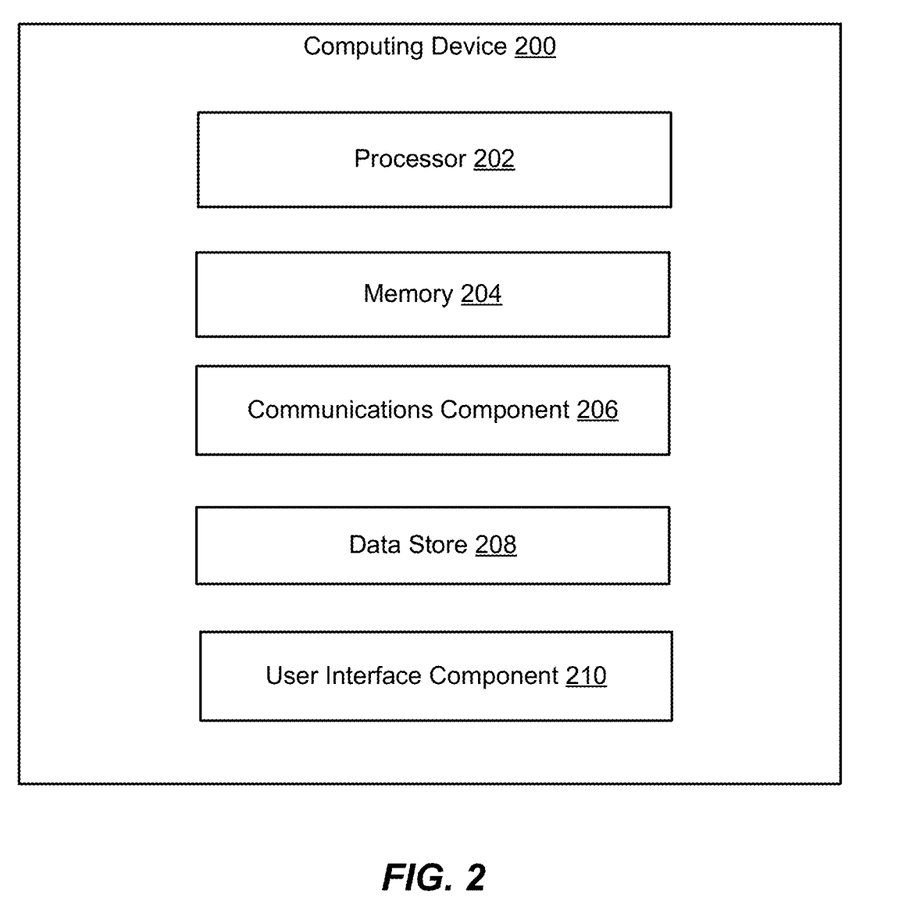
FIG. 2 is a block diagram of an example computing device which may implement a component in the example wireless communication network of FIG. 1.

Referring to FIG. 2, a computing device 200 may implement all or a portion of the functionality described in FIG. 1 above or described in FIGS. 3-5 below. For example, the computing device 200 may be or may include at least a portion of the wireless communication device 102, the device controller 106, each on the devices 114, the central controller 104, or any other component described herein with reference to FIG. 1 above. The computing device 200 includes a processor 202 which may be configured to execute or implement software, hardware, and/or firmware modules that perform any functionality described herein with reference to FIG. 1 above or with reference to FIGS. 3-5 below. For example, the processor 202 may be configured to execute or implement software, hardware, and/or firmware modules that perform any functionality described herein with reference to the wireless communication network 100, the wireless communication device 102, the device controller 106, each of the devices 114, the central controller 104, or any other component/system/device described herein with reference to FIG. 1 above.

The processor 202 may be a micro-controller, an application-specific integrated circuit (ASIC), or a field-programmable gate array (FPGA), and/or may include a single or multiple set of processors or multi-core processors. Moreover, the processor 202 may be implemented as an integrated processing system and/or a distributed processing system. The computing device 200 may further include a memory 204, such as for storing local versions of applications being executed by the processor 202, related instructions, parameters, etc. The memory 204 may include a type of memory usable by a computer, such as random access memory (RAM), read only memory (ROM), tapes, magnetic discs, optical discs, volatile memory, non-volatile memory, and any combination thereof. Additionally, the processor 202 and the memory 204 may include and execute an operating system executing on the processor 202, one or more applications, display drivers, etc., and/or other components of the computing device 200.

Further, the computing device 200 may include a communications component 206 that provides for establishing and maintaining communications with one or more other devices, parties, entities, etc. utilizing hardware, software, and services. The communications component 206 may carry communications between components on the computing device 200, as well as between the computing device 200 and external devices, such as devices located across a communications network and/or devices serially or locally connected to the computing device 200. For example, the computing device 200 may implement the wireless communication device 102 in FIG. 1, in which case the communications component 206 may provide for establishing and maintaining communications with the devices 114 and/or with the central controller 104. Similarly, the computing device 200 may implement the central controller 104 in FIG. 1, in which case the communications component 206 may provide for establishing and maintaining communications with the devices 114 and/or with the wireless communication device 102. As another example, the computing device 200 may implement one of the devices 114 in FIG. 1, in which case the communications component 206 may provide for establishing and maintaining communications with the wireless communication device 102 and/or with the central controller 104.

In an aspect, for example, the communications component 206 may include one or more buses, and may further include transmit chain components and receive chain components associated with a wireless or wired transmitter and receiver, respectively, operable for interfacing with external devices. For example, the computing device 200 may implement the wireless communication device 102 in FIG. 1, in which case the communications component 206 may include transmit chain components and receive chain components associated with a wireless transmitter and receiver, respectively, operable for interfacing with external devices such as the devices 114 and/or with the central controller 104. Similarly, the computing device 200 may implement the central controller 104 in FIG. 1, in which case the communications component 206 may include transmit chain components and receive chain components associated with a wireless transmitter and receiver, respectively, operable for interfacing with external devices such as the devices 114 and/or with the wireless communication device 102. As another example, the computing device 200 may implement one of the devices 114 in FIG. 1, in which case the communications component 206 may include transmit chain components and receive chain components associated with a wireless transmitter and receiver, respectively, operable for interfacing with external devices such as the wireless communication device 102 and/or with the central controller 104.

Additionally, the computing device 200 may include a data store 208, which can be any suitable combination of hardware and/or software, that provides for mass storage of information, databases, and programs. For example, the data store 208 may be or may include a data repository for applications and/or related parameters not currently being executed by processor 202. In addition, the data store 208 may be a data repository for an operating system, application, display driver, etc., executing on the processor 202, and/or one or more other components of the computing device 200.

The computing device 200 may also include a user interface component 210 operable to receive inputs from a user of the computing device 200 and further operable to generate outputs for presentation to the user (e.g., via a display interface to a display device). The user interface component 210 may include one or more input devices, including but not limited to a keyboard, a number pad, a mouse, a touch-sensitive display, a navigation key, a function key, a microphone, a voice recognition component, or any other mechanism capable of receiving an input from a user, or any combination thereof. Further, the user interface component 210 may include one or more output devices, including but not limited to a display interface, a speaker, a haptic feedback mechanism, a printer, any other mechanism capable of presenting an output to a user, or any combination thereof.

Figure 3:
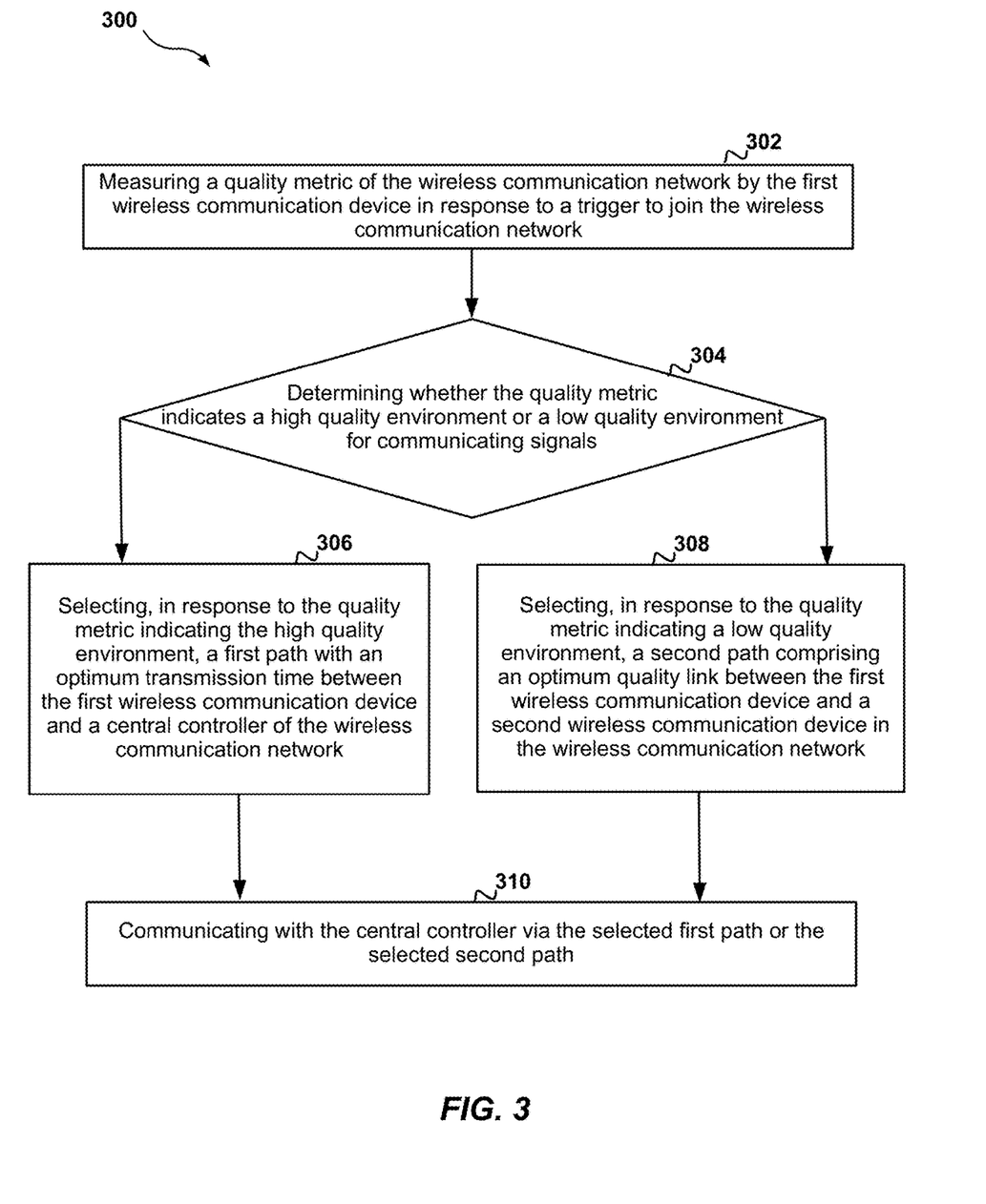
FIG. 3 is a flow diagram of a first example method of adaptively joining a wireless communication network.
Figure 4:
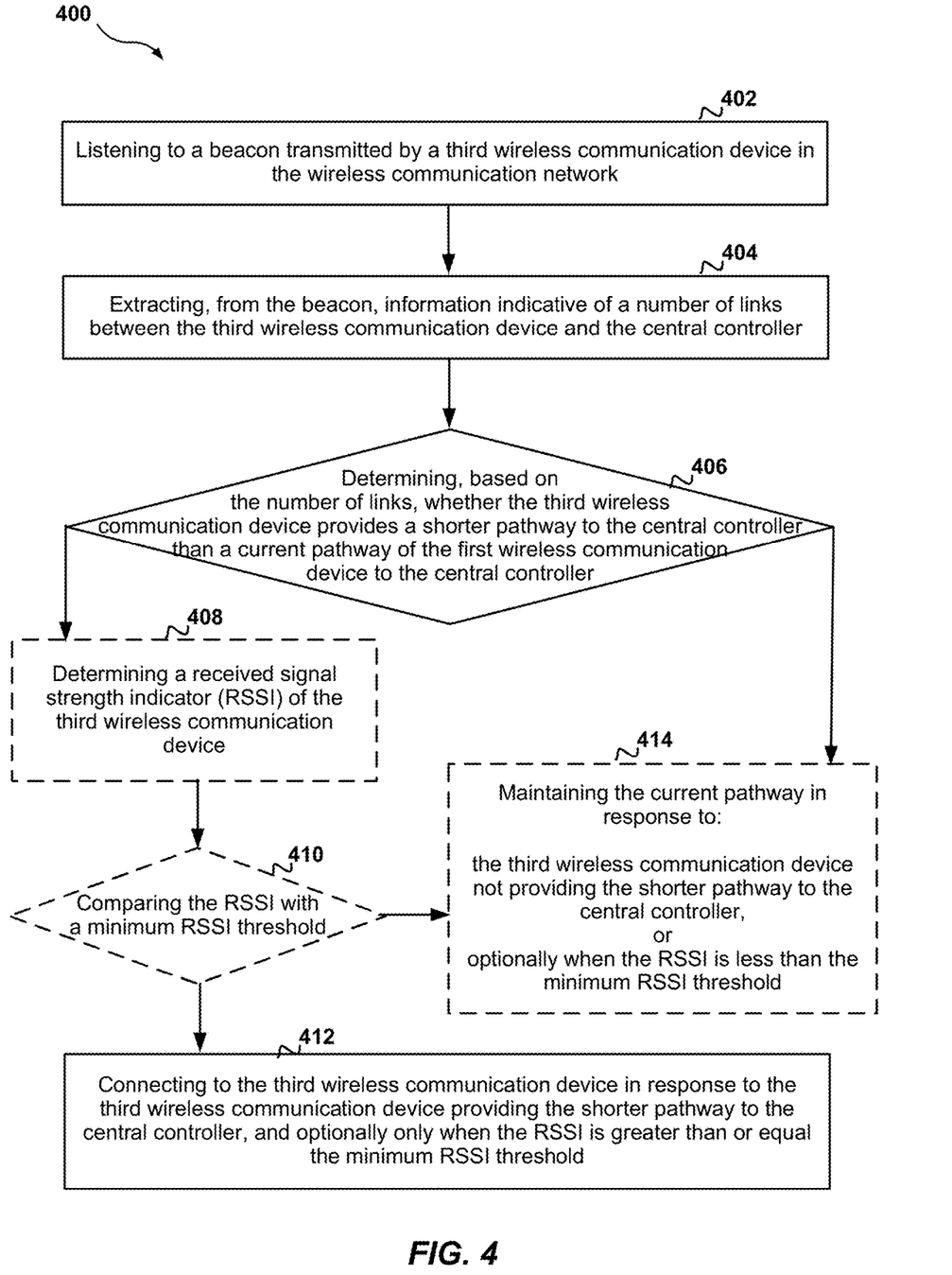
FIG. 4 is a flow diagram of a second example method of adaptively joining a wireless communication network.
Figure 5:
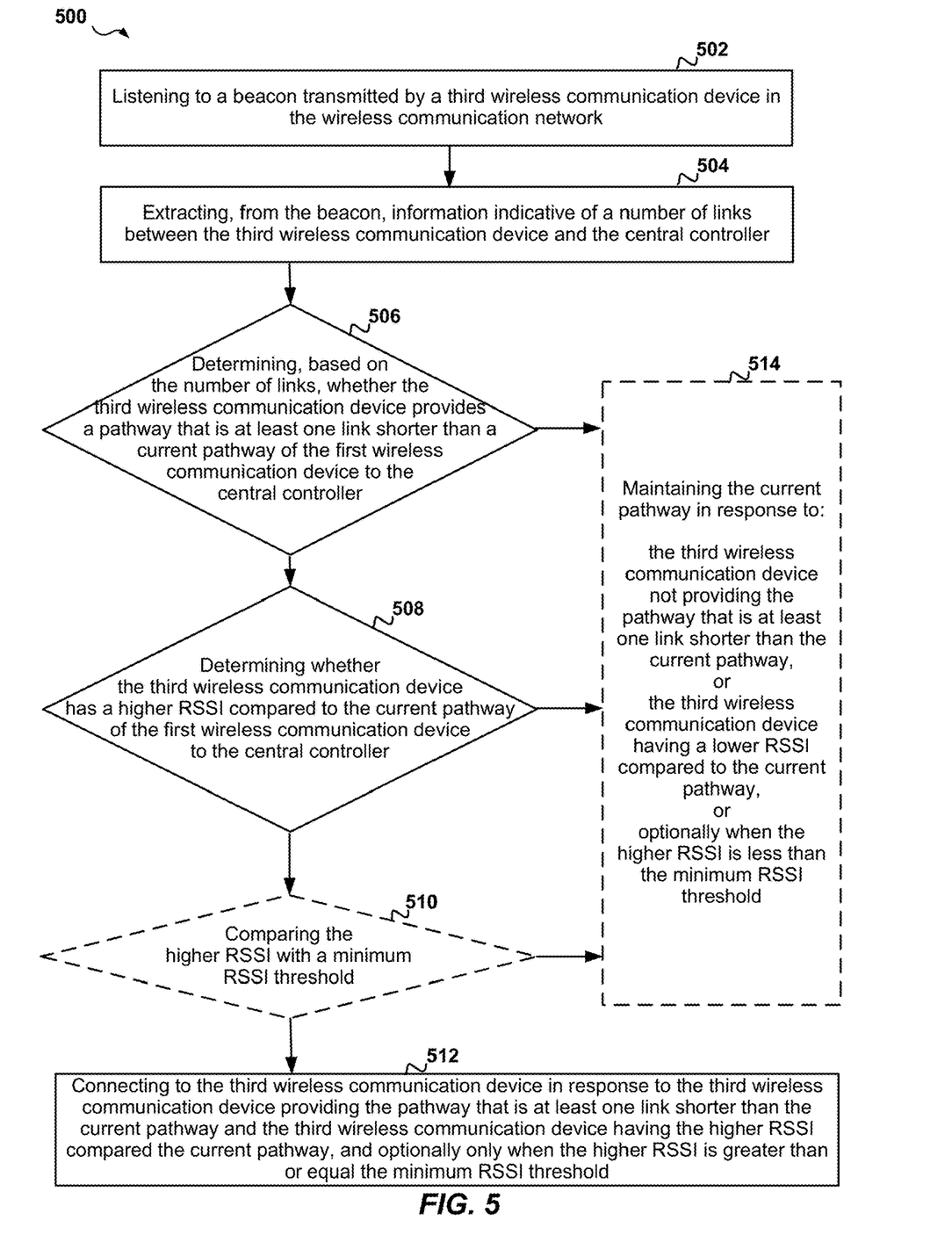
FIG. 5 is a flow diagram of a third example method of adaptively joining a wireless communication network.

FIGS. 3-5 are flowcharts of method 300, 400, and 500 of operation of the computing device 200. Each one of the methods 300, 400, and 500 may implement the functionality described herein with reference to FIGS. 1 and 2 above, and may be performed by one or more components of the computing device 200 or the wireless communication device 102 as described herein with reference to FIGS. 1 and 2 above.

Referring to FIG. 3, at 302 a method 300 of joining a wireless communication network by a first wireless communication device includes measuring a quality metric of the wireless communication network by the first wireless communication device in response to a trigger to join the wireless communication network. For example, in an aspect, the wireless communication device 102 may measure the quality metric 108 of the wireless communication network 100 in response to a trigger to join the wireless communication network 100. For example, the trigger may be automatically generated whenever the wireless communication device 102 is turned on. As another example, the trigger may be generated when the wireless communication device 102 falls off the wireless communication network 100, for example, due to strong RF interference, and needs to join again. In an aspect, for example, the quality metric 108 may be or may include, for example, network connectivity, traffic, throughout, noise level, interference level, bandwidth usage, or any other metric that may affect the quality of communicating signals in the operational RF bandwidth over the wireless communication network 100.

At 304 the method 300 may further include determining whether the quality metric indicates a high quality environment or a low quality environment for communicating signals. For example, in an aspect, the quality metric 108 may include or may be indicative of an RF background noise level in the wireless communication network 100 as locally observed by the wireless communication device 102. In this case, the device controller 106 of the wireless communication device 102 may compare the RF background noise level to a threshold noise level in order to determine whether the quality metric 108 indicates a high quality environment or a low quality environment.

At 306 the method 300 may further include selecting, in response to the quality metric indicating the high quality environment, a first pathway with an optimum transmission time between the first wireless communication device and a central controller of the wireless communication network. For example, in an aspect, in response to the quality metric 108 indicating the high quality environment, the device controller 106 may execute the "quiet" algorithm 110 of the adaptive join algorithm 120 to select the first pathway 118 which has an optimum transmission time between the wireless communication device 102 and the central controller 104 of the wireless communication network 100.

For example, optionally, in an aspect, the first pathway 118 may include an optimum number of RF links or hops between the wireless communication device 102 and the central controller 104. For example, in an aspect, the first pathway 118 may include the fewest number of RF links or hops between the wireless communication device 102 and the central controller 104, e.g., only one link/hop as in FIG. 1. Accordingly, for example, in an aspect, the first pathway 118 may be selected to provide the least transmission time between the wireless communication device 102 and the central controller 104.

At 308 the method 300 may include selecting, in response to the quality metric indicating a low quality environment, a second pathway comprising an optimum quality link between the first wireless communication device and a second wireless communication device in the wireless communication network. For example, in an aspect, in response to the quality metric 108 indicating a low quality environment, the device controller 106 may execute the "noisy" algorithm 112 of the adaptive join algorithm 120 to select the second pathway 116 which has an optimum quality link between the wireless communication device 102 and another device 114 in the wireless communication network 100.

For example, optionally, in an aspect, the second pathway 116 may include/provide the strongest link between the wireless communication device 102 and another device 114 in the wireless communication network 100 that provides the first hop in the second pathway 116 from the wireless communication device 102 and the central controller 104.

At 310 the method 300 may further include communicating with the central controller via the selected first pathway or the selected second pathway. For example, in an aspect, the wireless communication device 102 may communicate with the central controller 104 via a selected one of the first pathway 118 or the second pathway 116, depending on which one of the two pathways has been selected based on network environments, for example, as indicated by the quality metric 108.

Optionally, in an aspect, the wireless communication device 102 may repeat 306 or 308 to iterate over a number of candidate devices 114 to connect to, so that the wireless communication device 102 may continually achieve/establish improved or more optimal pathways with the central controller 104.

Referring to FIG. 4, optionally the selecting of the first pathway at 306 in FIG. 3 may be performed according to a method 400. Specifically, at 402 the method 400 may include listening to a beacon transmitted by a third wireless communication device in the wireless communication network. For example, the wireless communication device 102 may listen to a beacon transmitted by a device 114 in the wireless communication network 100, e.g., a third wireless communication device. For example, in an aspect, each device 114 in the wireless communication network 100 may periodically transmit/broadcast a beacon to announce various device-specific information such as information about the pathway of that device 114 to the central controller 104. Accordingly, the wireless communication device 102 may perform one or more listen/scan cycles and listen to the beacons transmitted by the devices 114.

At 404 the method 400 may further include extracting, from the beacon, information indicative of a number of links between the third wireless communication device and the central controller. For example, the device controller 106 of the wireless communication device 102 may extract, from the beacon, information indicative of a number of links between the central controller 104 and the device 114 that transmitted the beacon.

At 406 the method 400 may further include determining, based on the number of links, whether the third wireless communication device provides a shorter pathway to the central controller than a current pathway of the first wireless communication device to the central controller. For example, in an aspect, the device controller 106 may determine, based on the number of links as indicated by a beacon transmitted by a device 114, whether that device 114 provides a shorter pathway to the central controller 104 than a current pathway of the wireless communication device 102 to the central controller 104. For example, in an aspect, the device controller 106 may determine, based on the number of links as indicated by a beacon transmitted by a device 114, whether that device 114 provides a pathway with fewer links/hops to the central controller 104 as compared to a current pathway of the wireless communication device 102 to the central controller 104.

Optionally, at 408 the method 400 may further include determining an RSSI of the third wireless communication device. For example, optionally, in an aspect, the device controller 106 may also determine an RSSI of the device 114 that transmitted the beacon, for example, based on a signal strength of the beacon and a noise level in a dead zone.

Optionally, at 410 the method 400 may further include comparing the RSSI with a minimum RSSI threshold. For example, optionally, in an aspect, the device controller 106 may compare the RSSI of the device 114 that transmitted the beacon with a minimum RSSI threshold. For example, in an aspect, such a minimum RSSI threshold may be configured to guarantee a required fade margin for communicating.

At 412 the method 400 may further include connecting to the third wireless communication device in response to the third wireless communication device providing the shorter pathway to the central controller. For example, in an aspect, the device controller 106 may cause the wireless communication device 102 to connect to the device 114 that transmitted the beacon in response to the beacon indicating that the device 114 provides a shorter pathway to the central controller 104. Optionally, in an aspect, for example, the device controller 106 may further cause the wireless communication device 102 to connect to the device 114 that transmitted the beacon only when the RSSI of the device 114 is greater than or equal the minimum RSSI threshold.

Optionally, at 414 the method 400 may further include maintaining the current pathway in response to the third wireless communication device not providing the shorter pathway to the central controller. For example, in an aspect, the device controller 106 may maintain the current pathway in response to the beacon indicating that the device 114 does not provide a shorter pathway to the central controller 104. Optionally, in an aspect, for example, the device controller 106 may also maintain the current pathway when the RSSI of the device 114 is less than the minimum RSSI threshold.

Optionally, in an aspect, the wireless communication device 102 may repeat the method 400 to receive further beacons from other candidate devices 114 and iterate over such candidate devices 114, so that the wireless communication device 102 may continually achieve/establish improved or more optimal pathways with the central controller 104.

Referring to FIG. 5, optionally the selecting of the second pathway at 308 in FIG. 3 may be performed according to a method 500. Specifically, at 502 the method 500 may include listening to a beacon transmitted by a third wireless communication device in the wireless communication network. For example, the wireless communication device 102 may listen to a beacon transmitted by a device 114 in the wireless communication network 100, e.g., a third wireless communication device. For example, in an aspect, each device 114 in the wireless communication network 100 may periodically transmit/broadcast a beacon to announce various device-specific information such as information about the pathway of that device 114 to the central controller 104. Accordingly, the wireless communication device 102 may perform one or more listen/scan cycles and listen to the beacons transmitted by the devices 114.

At 504 the method 500 may further include extracting, from the beacon, information indicative of a number of links between the third wireless communication device and the central controller. For example, the device controller 106 of the wireless communication device 102 may extract, from the beacon, information indicative of a number of links/hops between the central controller 104 and the device 114 that transmitted the beacon.

At 506 the method 500 may further include determining, based on the number of links, whether the third wireless communication device provides a pathway that is at least one link shorter than a current pathway of the first wireless communication device to the central controller. For example, in an aspect, the device controller 106 may determine, based on the number of links as indicated by a beacon transmitted by a device 114, whether that device 114 provides a pathway that is at least one link/hop shorter than a current pathway of the wireless communication device 102 to the central controller 104.

At 508 the method 500 may further include determining whether the third wireless communication device has a higher RSSI compared to the current pathway of the first wireless communication device to the central controller. For example, in an aspect, the device controller 106 may determine whether the device 114 that transmitted the beacon has a higher RSSI compared to the current pathway of the wireless communication device 102 to the central controller 104. For example, in an aspect, the device controller 106 may compare the RSSI of the device 114 that transmitted the beacon with the RSSI of a device providing the first link in a current pathway to the central controller 104, and determine which one is higher.

Optionally, at 510 the method 500 may further include comparing the higher RSSI with a minimum RSSI threshold. For example, optionally, in an aspect, the device controller 106 may compare the RSSI of the device 114 that transmitted the beacon with a minimum RSSI threshold. For example, in an aspect, such a minimum RSSI threshold may be configured to guarantee a required fade margin for communicating.

At 512 the method 500 may further include connecting to the third wireless communication device in response to the third wireless communication device providing the pathway that is at least one link shorter than the current pathway and the third wireless communication device having the higher RSSI compared the current pathway. For example, in an aspect, the device controller 106 may cause the wireless communication device 102 to connect to the device 114 that transmitted the beacon in response to the beacon indicating that the device 114 provides a pathway that is at least one link shorter than a current pathway of the wireless communication device 102 to the central controller 104 and further in response to the device 114 having a higher RSSI compared to the current pathway of the wireless communication device 102 to the central controller 104. Optionally, in an aspect, for example, the device controller 106 may further cause the wireless communication device 102 to connect to the device 114 that transmitted the beacon only when the RSSI of the device 114 is greater than or equal the minimum RSSI threshold.

Optionally, at 514 the method 500 may further include maintaining the current pathway in response to the third wireless communication device not providing the pathway that is at least one link shorter than the current pathway, or the third wireless communication device having a lower RSSI compared the current pathway. For example, in an aspect, the device controller 106 may maintain the current pathway in response to the beacon transmitted by the device 114 indicating that the device 114 provides a pathway that is not at least one link shorter than a current pathway of the wireless communication device 102 to the central controller 104. Alternatively, in an aspect, the device controller 106 may maintain the current pathway in response to the device 114 having a lower RSSI compared to the current pathway of the wireless communication device 102 to the central controller 104. Optionally, in another alternative aspect, the device controller 106 may maintain the current pathway in response to the RSSI of the device 114 that transmitted the beacon having an RSSI that is less than the minimum RSSI threshold.

Optionally, in an aspect, the wireless communication device 102 may repeat the method 500 to receive further beacons from other candidate devices 114 and iterate over such candidate devices 114, so that the wireless communication device 102 may continually achieve/establish improved or more optimal pathways with the central controller 104.

For example, optionally, in an aspect, the wireless communication device 102 may continuously monitor the quality metric 108 of the wireless communication network 100, and determine whether the quality metric 108 indicates a change from the high quality environment to the low quality environment or from the low quality environment to the high quality environment. In response to detecting a change from the low quality environment to the high quality environment, the wireless communication device 102 may execute the quiet algorithm 110 and switch from using the second pathway 116 to using a first pathway 118 with optimum transmission time between the wireless communication device 102 and the central controller 104 of the wireless communication network 100. Similarly, in response to detecting a change from the high quality environment to the low quality environment, the wireless communication device 102 may execute the noisy algorithm 112 and switch from using the first pathway 118 to using a second pathway 116 that includes an optimum quality link between the wireless communication device 102 and another device 114 in the wireless communication network 100.

Optionally, in an aspect, for example, the wireless communication device 102 may select the first pathway 118 to meet a first minimum RSSI threshold, and select the second pathway 116 to meet a second minimum RSSI threshold that is different than the first minimum RSSI threshold.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of joining a wireless communication network by a first wireless communication device, comprising:
measuring a quality metric of the wireless communication network by the first wireless communication device in response to a trigger to join the wireless communication network;
determining whether the quality metric indicates a high quality environment or a low quality environment for communicating signals;
selecting, in response to the quality metric indicating the high quality environment, a first pathway with an optimum transmission time between the first wireless communication device and a central controller of the wireless communication network; and
selecting, in response to the quality metric indicating a low quality environment, a second pathway comprising an optimum quality link between the first wireless communication device and a second wireless communication device in the wireless communication network.

2. The method of claim 1, wherein the quality metric comprises a radio frequency (RF) background noise level of the wireless communication network, wherein the determining of whether the quality metric indicates the high quality environment or the low quality environment comprises comparing the RF background noise level to a threshold noise level.

3. The method of claim 1, wherein the selected first pathway comprises an optimum number of RF links between the first wireless communication device and the central controller.

4. The method of claim 1, wherein the selected first pathway comprises a fewest number of RF links between the first wireless communication device and the central controller.

5. The method of claim 1, wherein the selected first pathway has a least transmission time between the first wireless communication device and the central controller.

6. The method of claim 1, wherein the selected second pathway comprises a strongest link between the first wireless communication device and the second wireless communication device.

7. The method of claim 1, further comprising communicating with the central controller via the selected first pathway or the selected second pathway.

8. The method of claim 1, wherein the selecting of the first pathway comprises:
listening to a beacon transmitted by a third wireless communication device in the wireless communication network;
extracting, from the beacon, information indicative of a number of links between the third wireless communication device and the central controller;
determining, based on the number of links, whether the third wireless communication device provides a shorter pathway to the central controller than a current pathway of the first wireless communication device to the central controller; and
connecting to the third wireless communication device in response to the third wireless communication device providing the shorter pathway to the central controller.

9. The method of claim 8, wherein the selecting of the first pathway further comprises:
determining a received signal strength indicator (RSSI) of the third wireless communication device;
comparing the RSSI with a minimum RSSI threshold; and
wherein the connecting is performed only when the RSSI is greater than or equal the minimum RSSI threshold.

10. The method of claim 1, wherein the selecting of the second pathway comprises:
listening to a beacon transmitted by a third wireless communication device in the wireless communication network;
extracting, from the beacon, information indicative of a number of links between the third wireless communication device and the central controller;
determining, based on the number of links, whether the third wireless communication device provides a pathway that is at least one link shorter than a current pathway of the first wireless communication device to the central controller;
determining whether the third wireless communication device has a higher received signal strength indicator (RSSI) compared to the current pathway of the first wireless communication device to the central controller; and
connecting to the third wireless communication device in response to the third wireless communication device providing the pathway that is at least one link shorter than the current pathway and the third wireless communication device having the higher RSSI compared the current pathway.

11. The method of claim 10, further comprising:
comparing the higher RSSI with a minimum RSSI threshold; and
wherein the connecting is performed only when the higher RSSI is greater than or equal the minimum RSSI threshold.

12. The method of claim 1, further comprising:
continuously monitoring the quality metric of the wireless communication network by the first wireless communication device;
determining whether the quality metric indicates a change from the high quality environment to the low quality environment or from the low quality environment to the high quality environment;
switching, in response to the change from the low quality environment to the high quality environment, from the second pathway to another first pathway with another optimum transmission time between the first wireless communication device and the central controller of the wireless communication network; and
switching, in response to the change from the high quality environment to the low quality environment, from the first pathway to another second pathway comprising another optimum quality link between the first wireless communication device and the second wireless communication device in the wireless communication network.

13. The method of claim 1, wherein the first pathway is selected to meet a first minimum received signal strength indicator (RSSI) threshold, wherein the second pathway is selected to meet a second minimum RSSI threshold different than the first minimum RSSI threshold.

14. A first wireless communication device, comprising:
a processor; and
a memory coupled to the processor and storing instructions that, when executed by the processor cause the processor to:

measure a quality metric of a wireless communication network in response to a trigger to join the wireless communication network;

determine whether the quality metric indicates a high quality environment or a low quality environment for communicating signals;

select, in response to the quality metric indicating the high quality environment, a first pathway with an optimum transmission time between the first wireless communication device and a central controller of the wireless communication network; and select, in response to the quality metric indicating a low quality environment, a second pathway comprising an optimum quality link between the first wireless communication device and a second wireless communication device in the wireless communication network.

15. The first wireless communication device of claim 14, wherein the quality metric comprises a radio frequency (RF) background noise level of the wireless communication network, wherein the processor determines whether the quality metric indicates the high quality environment or the low quality environment by comparing the RF background noise level to a threshold noise level.

16. The first wireless communication device of claim 14, wherein the selected first pathway comprises an optimum number of RF links between the first wireless communication device and the central controller.

17. The first wireless communication device of claim 14, wherein the selected first pathway comprises a fewest number of RF links between the first wireless communication device and the central controller.

18. The first wireless communication device of claim 14, wherein the selected first pathway has a least transmission time between the first wireless communication device and the central controller.

19. The first wireless communication device of claim 14, wherein the selected second pathway comprises a strongest link between the first wireless communication device and the second wireless communication device.

20. A non-transitory computer-readable medium storing instructions that, when executed by a processor of a first wireless communication device, cause the first wireless communication device to join a wireless communication network, the processor configured to:

measure a quality metric of the wireless communication network by the first wireless communication device in response to a trigger to join the wireless communication network;

determine whether the quality metric indicates a high quality environment or a low quality environment for communicating signals;

select, in response to the quality metric indicating the high quality environment, a first pathway with an optimum transmission time between the first wireless communication device and a central controller of the wireless communication network; and select, in response to the quality metric indicating a low quality environment, a second pathway comprising an optimum quality link between the first wireless communication device and a second wireless communication device in the wireless communication network.

* * * * *

UNITED STATES PATENT AND TRADEMARK OFFICE
CERTIFICATE OF CORRECTION

PATENT NO. : 10,764,810 B1
APPLICATION NO. : 16/363666
DATED : September 1, 2020
INVENTOR(S) : Martin A. Chiarizio et al.

Page 1 of 1

It is certified that error appears in the above-identified patent and that said Letters Patent is hereby corrected as shown below:

In the Specification

Column 1, Line 38, delete "ofjoining" and insert -- of joining --, therefor.

Column 5, Line 9, delete "and or" and insert -- and/or --, therefor.

Column 18, Line 14, delete "quiet algorithm" and insert -- "quiet" algorithm --, therefor.

Column 18, Line 22, delete "noisy algorithm" and insert -- "noisy" algorithm --, therefor.

Signed and Sealed this
Seventeenth Day of November, 2020

Andrei Iancu
*Director of the United States Patent and Trademark Office*